United States Patent [19]

Järvstrat

[11] Patent Number: 4,860,693
[45] Date of Patent: Aug. 29, 1989

[54] METHOD IN FLUIDIZED BED COMBUSTION

[75] Inventor: Göran Järvstrat, Linköping, Sweden

[73] Assignee: Asea Stal AB, Linköping, Sweden

[21] Appl. No.: 89,737

[22] Filed: Aug. 26, 1987

[30] Foreign Application Priority Data

Aug. 28, 1986 [SE] Sweden .................................. 8603625

[51] Int. Cl.$^4$ .............................................. F22B 1/00
[52] U.S. Cl. .................................. 122/4 D; 110/245; 165/104.16; 431/7
[58] Field of Search .................. 122/4 D; 110/245; 165/104.16; 431/7

[56] References Cited

U.S. PATENT DOCUMENTS

| | | |
|---|---|---|
| 3,893,426 | 7/1985 | Bryers . |
| 3,921,590 | 11/1975 | Mitchell et al. ............... 122/4 D |
| 4,279,207 | 7/1981 | Wormser . |
| 4,416,418 | 11/1983 | Goodstine . |
| 4,475,884 | 10/1984 | Shang . |
| 4,548,138 | 10/1985 | Korenberg ............... 122/4 D X |
| 4,594,967 | 6/1986 | Wolowodiuk ............... 122/4 D |
| 4,656,972 | 4/1987 | Shimoda .................. 110/204 X |
| 4,665,864 | 5/1987 | Seshamani et al. ............ 122/4 D |
| 4,688,521 | 8/1987 | Korenberg ............... 122/4 D |

FOREIGN PATENT DOCUMENTS

| | | |
|---|---|---|
| 92622 | 2/1983 | European Pat. Off. . |
| 144172 | 12/1985 | European Pat. Off. . |
| 2029155 | 12/1970 | Fed. Rep. of Germany . |
| 2352412 | 10/1973 | Fed. Rep. of Germany . |
| 8502618 | 6/1984 | Sweden . |
| 1379578 | 1/1975 | United Kingdom . |

OTHER PUBLICATIONS

Japanese Abstract 56-42008, published 24 Jun. 1981.
Japanese Abstract 56-157707, published 17 Mar. 1982.
Japanese Abstract 56-36635, published 29 May 1979.
Patent Abstracts of Japan, vol. 4, Mar. 1980, Abstract of JP 55-6140 published Jan. 17, 1980.

*Primary Examiner*—Edward G. Favors
*Attorney, Agent, or Firm*—Merchant, Gould, Smith, Edell, Welter & Schmidt

[57] ABSTRACT

Method in combusting solid fuel in a first fluidized bed (11) and a second fluidized bed (12) located laterally of the first bed, said beds being mutually separated but communicating with each other. Fuel particles are transferred from the first bed to the second bed. The first bed is operated substoichiometrically and the second bed is operated with a large excess of air. Flue gas from the first bed is diverted in a common freeboard over the beds to be directed in counterflow towards the flue gas from the second bed. Heat power is recovered solely from the second bed.

9 Claims, 1 Drawing Sheet

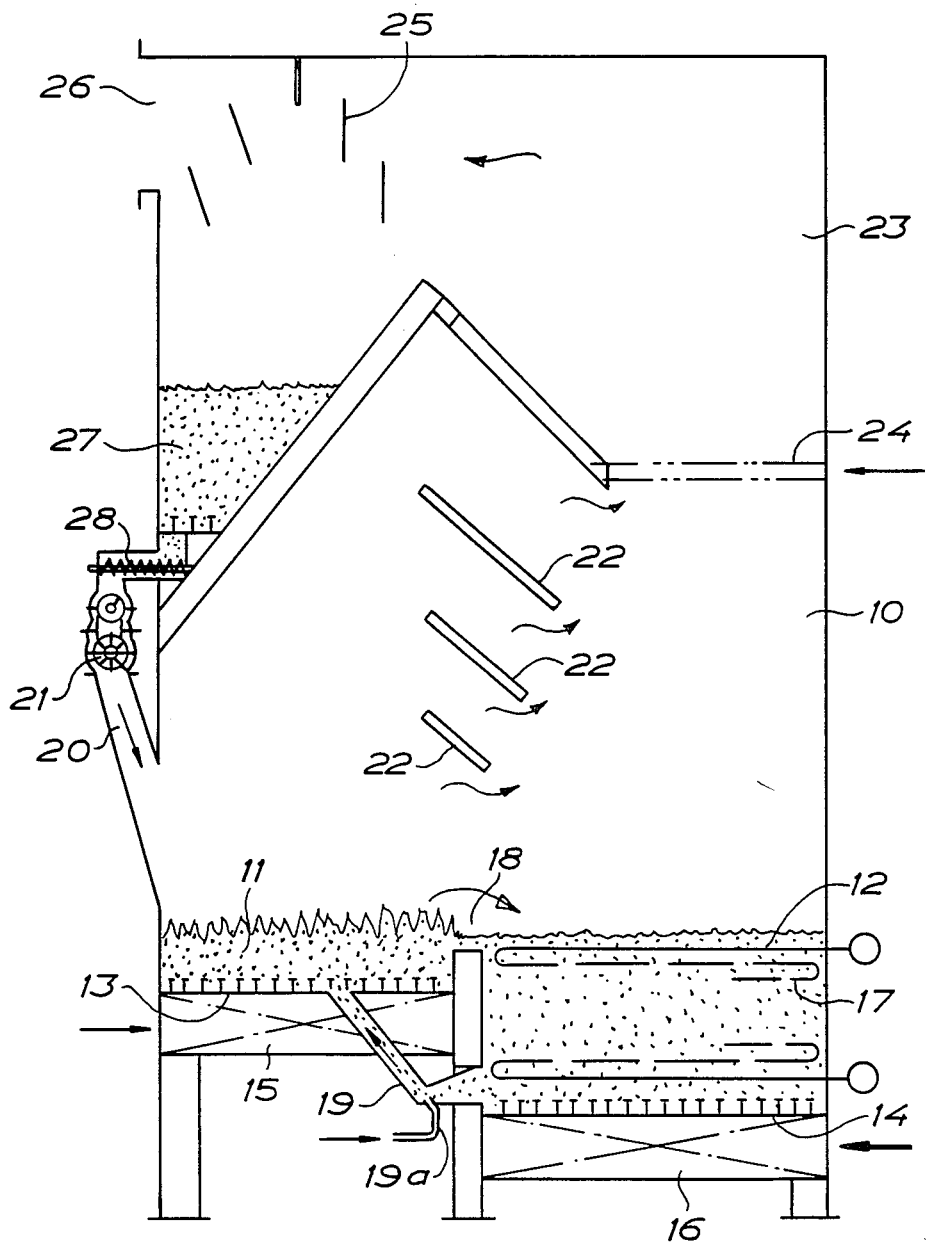

METHOD IN FLUIDIZED BED COMBUSTION

The invention relates to a method in combusting solid fuel in a first fluidized bed and a second fluidized bed located laterally of the first bed, said beds being mutually separated but communicating with each other, wherein fuel particles are transferred from the first bed to the second bed.

Combustion in two fluidized beds communicating with each other is disclosed in US-A-3,893,426, JP-A-58-85004, and JP-A-58-95104, ash particles in the flue gases from the first fluidized bed in the latter case being transferred to the second fluidized bed to be combusted therein.

The purpose of the invention is to make possible that fuels having a low heat value, such as humid biofuel, is combusted in a stage combustion boiler of a known construction, wherein fuel is supplied to the beds from the top thereof, ash recirculation is provided, and subpressure firing in freeboard is applied, without the necessity of reconstructing the boiler.

BRIEF DESCRIPTION OF THE DRAWING

In order to explain the invention in more detail it will be described below with reference to the accompanying drawing in which the FIGURE is a diagrammatic vertical cross-sectional view of an embodiment of a stage combustion boiler for working the method of the invention.

DETAILED DESCRIPTION

According to the drawing there is provided in a boiler casing 10 a first bed 11 and laterally thereof a second bed 12, said beds having a common freeboard. The beds thus positioned in parallel to each other, comprise a particulate material, substantially ash, sand and/or sulphur sorbent such as lime or dolomite. The beds are supported by bed bottoms 13 and 14, respectively, having a great number of nozzles of known construction uniformly distributed over the total area of the bed bottom, for the supply of a gaseous fluid either solely air or air mixed with flue gas, from manifolds 15 and 16, respectively, below the bed bottom for fluidizing the two beds. The second bed 12 can be deeper than the first bed 11 as in the present case, and it contains one or more tube sets or heat coils 17 for generating steam or hot water. Communication is provided between the beds at the top thereof as an overflow 18 from the first bed 11 to the second bed 12, a connection 19 with suitable conveyor means such as a pneumatic injector 19a being provided at the bottom for controlled transfer of bed material from the second bed 12 to the first bed 11.

An inlet 20 having a gate 21 is provided for the supply of fuel, sulphur adsorbent and elutriated ash to the first bed 11 from the top thereof. The sulphur adsorbent then can be added to the fuel in line externally of the boiler. Instead of being supplied from the top of the bed the fuel can be injected into the bed proper e.g. from below through one or more supply conduits opening in the bed. In the freeboard over the two beds a number of cooled or uncooled insulated flow deflectors 22 are provided to direct flue gas from the first fluidized bed 11 towards the flue gas from the second fluidized bed 12. A passage 23 having means 24 for the supply of combustion air in addition to air supplied through the fluidized beds is provided for the discharge of the flue gases from the freeboard and directing the flue gases horizontally. The passage 23 connects over a dust separator 25 to a flue gas outlet 26 which can be connected to a laterally positioned external flue gas boiler. In order to avoid a too high flue gas temperature in the boiler casing at the top thereof there should be provided in this portion of the boiler casing adjusted cooling surfaces in the conventional manner. A pocket 27 is provided for collecting dust from the dust separator 25 and is provided with a conveyor 28 for recirculation of separated dust to the first fluidized bed 11 through the inlet 20, but there should also be provided means for discharging excess dust in connection with the recirculation of dust although such means are not shown here. Alternatively, the dust in the pocket can flow by gravity through a conduit directly into the bed 11.

When the method of the invention is applied in the boiler described the start can be effected by using one or more freeboard burners operating with gas, oil, or powder, which are directed towards the first bed 11 which is an "uncooled" bed, since no heat exchange tubes are arranged therein. During the starting procedure the bed is fired with excess air. When the start has taken place and the continuous operation takes over, the first bed 11 is fired substoichiometrically by supplying primary air through the bed bottom 13 from the manifold 15 at a velocity of about 3 m/s. Flue gas may be mixed with the air supplied from the manifold 15 in a suitable proportion so as to achieve substoichiometrical combustion. The temperature of the bed 11 (the cooling of the bed) is controlled partly by adjusting the supply of fuel and/or air/flue gas, and partly by varying the amount of material supplied to the bed 11 from the bed 12 through the connection 19. Material is supplied to the second bed 12 partly from the bed 11 via the overflow 18 and partly by dust and splash falling down separated from the flue gas leaving the bed 11, when such flue gas is directed towards the flue gas from the bed 12. Secondary air is supplied to the latter bed through the bed bottom 14 from the manifold 16, and this bed is fired with a large excess of air, the secondary air being supplied at a velocity of about 1.5 m/s. It is advantageous to have such a low air velocity in this bed, because erosion on the tubes 17 is avoided. The flue gas from the bed 12 thus is considerably richer in oxygen than the flue gas from the bed 11. By raising or lowering the bed level or by controlling the recirculation flow from the bed 12 to the bed 11 it is possible to increase and decrease, respectively, the supply of material from the bed 11, which is richer in fuel, to the bed 12, which is poorer in fuel, and vice versa. In other words, it is possible to de-activate said latter bed more or less and at the same time to balance the cooling of the bed 11. This control has to take place in dependence on the type of fuel used. Thus, there is provided in this manner an excellent possibility of adapting the combustion to different types of fuel in one and the same boiler construction. The take-up of heat via the tubes 17 in the bed 12 can be adjusted partly by controlling the temperature of the bed and partly by controlling the level of the bed in relation to the tubes 17.

By operating the first bed 11 with substoichiometrical combustion the desulphuring by the supply of sulphur adsorbent will be less effective in this bed, but on the other hand the advantage is achieved that low contents of nitrogen oxides (NOX) in the flue gas from the bed 11 are obtained, the main combustion of the fuel taking place in said bed. Due to the transfer of dust and splash from the flue gas from the first bed 11 to the second bed 12 which is fired at a large excess of air, an effective desulphuring is obtained in said latter bed. However, if necessary the desulphuring can be further improved by making the first bed 11 deeper and by differentiating the air supply, a minor amount of air being supplied to the lower portion of the bed and a major amount of air being supplied to the upper portion of the bed.

I claim:

1. Method of combusting solid fuel in a first fluidized bed and a second fluidized bed located laterally of the first bed, said beds being mutually separated but communicating with each other, a common freeboard being provided above the beds, the method comprising the steps of:
    (a) operating the first bed substoichiometrically;
    (b) positively directing flue gas from the first bed towards the second bed in said common freeboard in counterflow to the flue gas from the second bed to direct fuel particles entrained in the flue gas from the first bed towards the second bed;
    (c) regulating the height of said first and second beds to cause overflow of fuel particles from said first to said second bed;
    (d) supplying particulate material from said second bed to said first bed by removing material from the bottom of the second bed and supplying it to the bottom of the first bed;
    (e) operating the second bed with large excess of air;
    (f) efficiently mixing the flue gases from the two beds; and
    (g) recovering heat power by heat exchange solely from said second bed.

2. The method of claim 1 wherein the heat recovery in the second bed is controlled by adjusting the temperature level in the bed.

3. Method as in claim 1 wherein the cooling of the first bed is varied by controlling the flow of particulate material between the beds.

4. Method as in claim 1 wherein dust separated from the flue gas from the two beds is recycled to the first bed (11).

5. Method as in claim 1 wherein the air velocity in the first bed (11) is considerably greater than the air velocity in the second bed (12).

6. Method as in claim 5 wherein the heat recover in the second bed (12) is controlled by adjusting the level of the bed (12) in relation to a heat exchanger (17).

7. Method as in claim 6 wherein the heat recover in the second bed is controlled by adjusting the temperature level in the bed.

8. Method as in claim 1 wherein fuel is supplied to the first bed (11) from the top thereof.

9. Method as in claim 1 wherein air mixed with flue gas is supplied to the first bed (11).

* * * * *